(12) United States Patent
Dotchkoff et al.

(10) Patent No.: US 11,012,324 B2
(45) Date of Patent: May 18, 2021

(54) EXPLICIT INTERACTION CONTRACTS FOR NETWORK CONNECTED DEVICES

(71) Applicant: Microsoft Technology Licensing, LLC, Redmond, WA (US)

(72) Inventors: Konstantin Dotchkoff, Redmond, WA (US); Elio Damaggio, Redmond, WA (US); Brian Robert Crawford, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 16/192,706

(22) Filed: Nov. 15, 2018

(65) Prior Publication Data

US 2020/0162347 A1 May 21, 2020

(51) Int. Cl.
*G06F 15/173* (2006.01)
*H04L 12/24* (2006.01)
(Continued)

(52) U.S. Cl.
CPC ...... *H04L 41/5045* (2013.01); *H04L 41/0686* (2013.01); *H04L 43/065* (2013.01); *H04L 67/10* (2013.01); *H04L 67/125* (2013.01)

(58) Field of Classification Search
CPC ............. H04L 41/5045; H04L 41/0686; H04L 43/065; H04L 67/10; H04L 67/125
(Continued)

(56) References Cited

U.S. PATENT DOCUMENTS 7,051,097 B1 * 5/2006 Pecina .................... H04L 67/34
707/999.104
8,806,550 B1 * 8/2014 Chan .................. H04N 21/6168
725/107
(Continued)

FOREIGN PATENT DOCUMENTS

WO 2015081063 A1 6/2015

OTHER PUBLICATIONS

"Unlocks competitive growth with new services and applications for the Internet of Things", Retrieved From https://plafform.innovation.nokia.com/services.php?service_id=5911efac48d5f4645c849b8b, Jan. 2017, 2 Pages.
(Continued)

Primary Examiner — Thu Ha T Nguyen
(74) Attorney, Agent, or Firm — Alleman Hall Creasman & Tuttle LLP (57) ABSTRACT

A computer system is provided that includes one or more processors configured to store a plurality of software interfaces that define explicit interaction contracts between network connected devices and software services. The one or more processors are configured to execute a plurality of software services. Each software service defines one or more software interfaces operated on by that software service. The one or more processors are configured to receive, from a network connected device, a list of one or more software interfaces implemented by the network connected device, select one or more software services based on a match between the one or more software interfaces implemented by the network connected device and the one or more software interfaces operated on by the plurality of software services, and process data received from the network connected device using the selected software services.

18 Claims, 7 Drawing Sheets

(51) Int. Cl.
  *H04L 12/26* (2006.01)
  *H04L 29/08* (2006.01)
(58) Field of Classification Search
  USPC .................................................. 709/223, 224
  See application file for complete search history.

(56) References Cited

U.S. PATENT DOCUMENTS

| | | | |
|---|---|---|---|
| 9,491,181 B2 | 11/2016 | Formo et al. | |
| 9,641,400 B2 | 5/2017 | Britt et al. | |
| 10,326,826 B1* | 6/2019 | Fitzgerald | H04L 67/02 |
| 10,474,809 B1* | 11/2019 | Wurmfeld | H04L 9/0643 |
| 10,560,309 B1* | 2/2020 | Chitalia | H04L 41/069 |
| 2004/0218602 A1* | 11/2004 | Hrastar | H04L 63/1416 370/390 |
| 2005/0233733 A1* | 10/2005 | Roundtree | G06F 9/45512 455/414.1 |
| 2006/0031457 A1* | 2/2006 | Motoyama | H04L 12/2803 709/224 |
| 2014/0324973 A1* | 10/2014 | Goel | H04L 47/70 709/204 |
| 2015/0156266 A1* | 6/2015 | Gupta | H04L 67/12 709/224 |
| 2016/0050131 A1* | 2/2016 | Zhang | H04L 41/0681 370/244 |
| 2016/0103887 A1* | 4/2016 | Fletcher | G06F 16/903 707/722 |
| 2016/0103888 A1* | 4/2016 | Fletcher | G06F 16/2455 707/722 |
| 2016/0135241 A1* | 5/2016 | Gujral | H04L 67/12 370/328 |
| 2016/0205106 A1 | 7/2016 | Yacoub et al. | |
| 2017/0008162 A1* | 1/2017 | Tsubota | G05B 19/00 |
| 2017/0141946 A1* | 5/2017 | Balestrazzi | H04L 41/0803 |
| 2018/0013579 A1* | 1/2018 | Fairweather | H04L 67/125 |
| 2018/0234496 A1* | 8/2018 | Ratias | G06F 16/27 |
| 2019/0014117 A1* | 1/2019 | Li | H04W 12/08 |
| 2019/0042955 A1* | 2/2019 | Cahill | G06N 5/04 |
| 2019/0303579 A1* | 10/2019 | Reddy | G06F 21/57 |
| 2019/0349426 A1* | 11/2019 | Smith | H04L 67/104 |
| 2020/0005412 A1* | 1/2020 | Wu | G06Q 10/063112 |
| 2020/0050494 A1* | 2/2020 | Bartfai-Walcott | G06F 9/5083 |
| 2020/0067938 A1* | 2/2020 | Smith | H04L 63/105 |
| 2020/0162347 A1* | 5/2020 | Dotchkoff | H04L 41/5045 |
| 2020/0196237 A1* | 6/2020 | Williams | H04W 4/12 |
| 2020/0278830 A1* | 9/2020 | Krzyzanowski | G06F 3/04817 |
| 2020/0404069 A1* | 12/2020 | Li | H04L 67/289 |

OTHER PUBLICATIONS

"Web of Things at W3C", Retrieved From «https://www.w3.org/WoT/», Retrieved on: Oct. 15, 2018, 3 Pages.

Gollogly Jonathan J, "Application as Filed in U.S. Appl. No. 15/945,724", filed Apr. 4, 2018, 33 Pages.

Amyx, Scott, "67 open source tools and resources for IoT", Retrieved From «https://web.archive.org/web/20150724112752/https:/techbeacon.com/67-open-source-tools-resources-iot», Jul. 24, 2015, 15 Pages.

Kim, et al., "A Security Generic Service Interface of Internet of Things (IoT) Platforms", In Journal of Symmetry, vol. 9, Issue 9, Aug. 26, 2017, 14 Pages.

Ocetník, Dávid, "Introduction to Zetta", Retrieved From https://github.com/zettajs/zetta/wiki/Overview, May 15, 2016, 5 Pages.

Sotiriadis, et al., "Future Internet Systems Design and Implementation: Cloud and IoT services based on IoT-A and FIWARE", In Publication of Springer, Dec. 2017, 17 Pages.

"IoT-Ready Alliance Introduces First Internet Of Things Interface Specification—Enabling Future-Proof Buildings" https://www.iot-ready.org/News-Events/Press-Releases/ID/23/IoT-Ready-Alliance-Introduces-First-Internet-of-Things-Interface-Specification--Enabling-Future-proof-Buildings, May 3, 2018, 2 Pages.

"International Search Report Issued in PCT Application No. PCT/US19/059941", dated Feb. 12, 2020, 11 Pages.

* cited by examiner

```
SOFTWARE INTERFACE 14

{
    "@ID": "HTTP://EXAMPLE.COM/THERMOSTAT/1.0.0",
    "@TYPE": "INTERFACE",
    "DISPLAYNAME": "THERMOSTAT",
    "CONTENTS": [
        {                                         ─ 54
            "@TYPE": ["TELEMETRY", "TEMPERATURE"],
            "NAME": "TEMP",
            "SCHEMA": "DOUBLE"
        },
        {
            "@TYPE": "PROPERTY",    ─ 56
            "NAME": "SETPOINTTEMP",
            "WRITABLE": TRUE,
            "SCHEMA": "DOUBLE"
        }
    ],
    "@CONTEXT": "HTTP://EXAMPLE.COM/V0/CONTEXTS/INTERFACE.JSON"
}
```

52 — (brace grouping the two CONTENTS items)

FIG. 4

EXTENDED SOFTWARE INTERFACE 64

```
{
  "@ID": "HTTP://EXAMPLE.COM/THERMOSTAT/1.0.0",
  "@TYPE": "INTERFACE",
  "DISPLAYNAME": "THERMOSTAT",
  "CONTENTS": [
    {
      "@TYPE": "TELEMETRY",
      "NAME": "TEMP",
      "SCHEMA": "DOUBLE"
    },
    {
      "@TYPE": "PROPERTY",
      "NAME": "SETPOINTTEMP",
      "WRITABLE": TRUE,
      "SCHEMA": "DOUBLE"
    },
    {                                         — 66
      "@TYPE": "TELEMETRY",
      "NAME": "GPS",
      "SCHEMA": "DOUBLE"
    }
  ],
  "@CONTEXT": "HTTP://EXAMPLE.COM/V0/CONTEXTS/INTERFACE.JSON"
}
```

EXPLICIT INTERACTION CONTRACTS FOR NETWORK CONNECTED DEVICES

BACKGROUND

Typically, software solution backend development for internet of things (IoT) devices may be performed by different teams, organizations or vendors. Interoperability issues between the device code and the software solution backend can increase development times and increase workload for the developers. Additionally, software solutions developed for one IoT device type may typically only be applicable to that device type, and are not quickly adaptable to other IoT device types.

SUMMARY

A computer system is provided that includes one or more processors configured to store a plurality of software interfaces that define explicit interaction contracts between network connected devices and software services. The one or more processors are configured to execute a plurality of software services. Each software service defines one or more software interfaces operated on by that software service. The one or more processors are configured to receive, from a network connected device, an indication of one or more software interfaces implemented by the network connected device, select one or more software services based on a match between the one or more software interfaces implemented by the network connected device and the one or more software interfaces operated on by the plurality of software services, and process data received from the network connected device or send a command to the network connected device using the selected software services according to the explicit interaction contracts of the one or more software interfaces.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
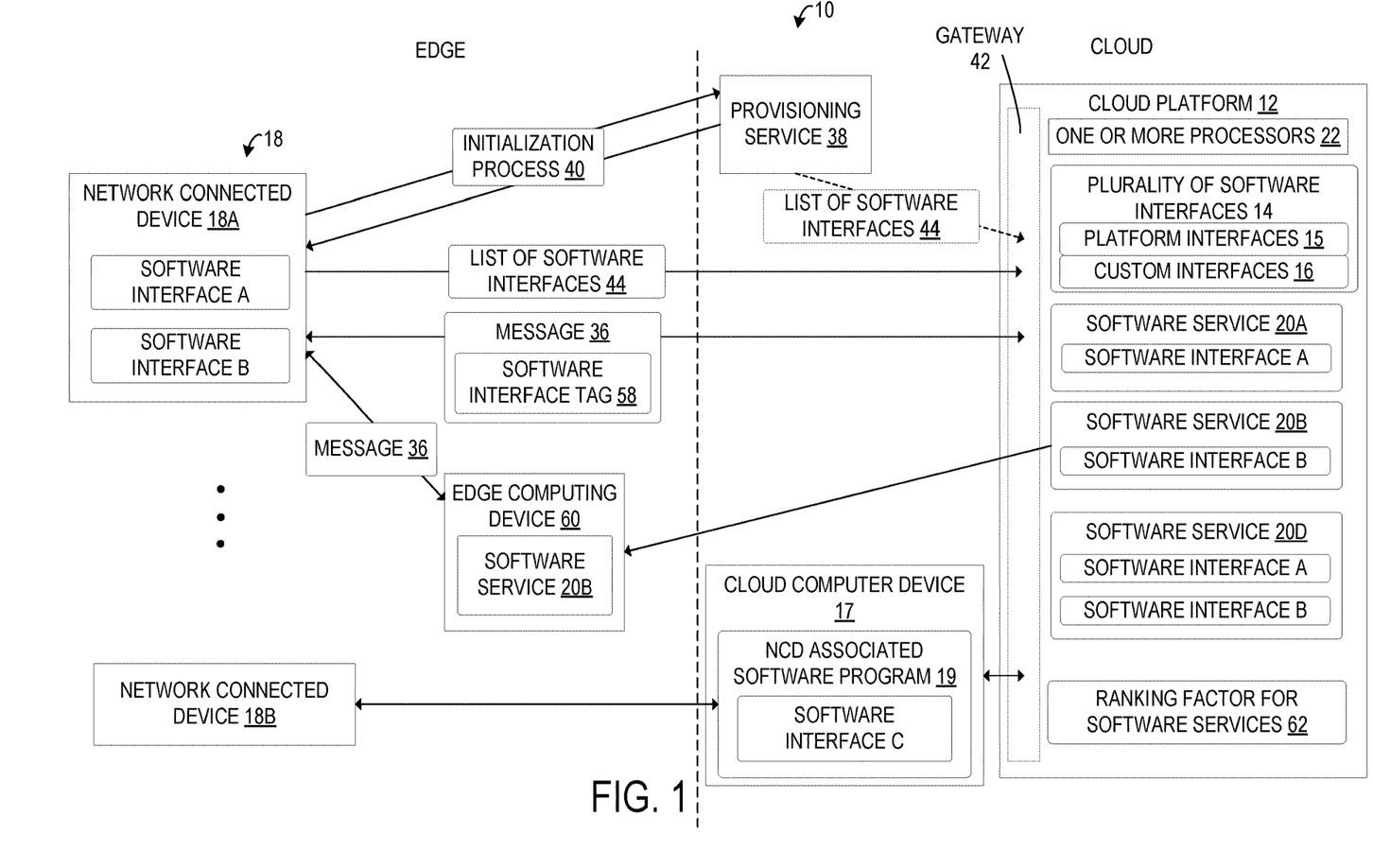
FIG. 1 shows an example computer system for processing data from network connected devices using software services according to the explicit interaction contracts of software interfaces.

To address these issues, a computer system 10 is provided. FIG. 1 illustrates a computer system 10 that includes a cloud platform 12 configured to store and manage a plurality of software interfaces 14. In one example, the plurality of software interfaces 14 may include platform software interfaces 15 that are provided and controlled by the cloud platform 12. The plurality of software interfaces 14 may further include custom software interfaces 16 that are created by manufacturers of network connected devices 18, developers of software services 20, or other users of the cloud platform 12. Each software interface 14 defines explicit interaction contracts between network connected devices 18 operated by customers and users of the cloud platform 12 and software services 20 created by developers. The software services 20 may be developed by the manufacturers of the network connected devices 18, by third party developers unrelated to the manufacturers of the network connected devices 18, by the users of the network connected devices 18, and by other users of the cloud platform 12. An explicit interaction contract is a data file that defines the schemas and protocols according to which data should be sent and received between a client and server, for example.

In one example, the cloud platform 12 comprises one or more processors 22 configured to execute the processes and functions of the cloud platform 12 described herein. The cloud platform may include one or more server devices configured to operate in a cloud computing configuration. As illustrated in FIG. 1, the cloud platform 12 is configured to execute a plurality of software services 20, each software service defining one or more software interfaces 14 operated on by that software service 20. In one example, the plurality of software services 20 are configured to process data according to the explicit interaction contracts of the one or more software interfaces 14 that the software service 20 has been developed to utilize. These software services 20 may be developed by first or third parties, and uploaded to the cloud platform 12. In one example, the cloud platform 12 may perform testing, authentication, and certification processes on each uploaded software service before making those software services available on the cloud platform 12. For example, the cloud platform 12 may be configured to test whether each software service 20 correctly implements one or more software interfaces 14. These software services 20 may then be stored and executed on the cloud platform 12 to process data from network connected devices 18 operated by users of the cloud platform 12.

Figure 2:
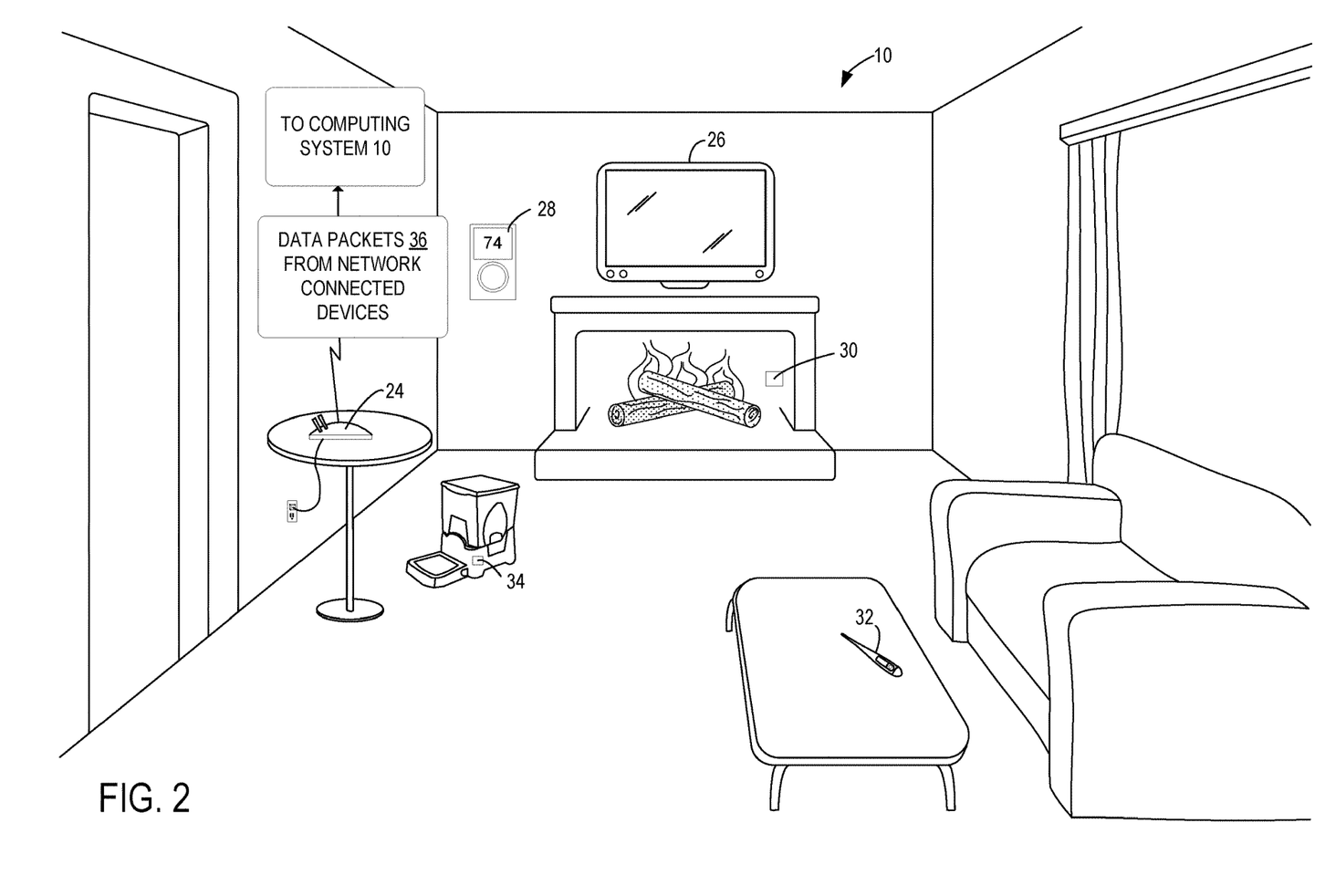
FIG. 2 shows an example of the plurality of network connected devices of FIG. 1.

FIG. 2 illustrates an example of a plurality of network connected devices 18 distributed around an example physical environment, namely, a house of a user. The network connected devices may be configured to connect to a wide area network (WAN) via a router 24. As a specific example, the router 24 may take the form of a wireless network device mediating a wireless network that may be utilized by the plurality of network connected devices 18 in the physical environment. In another example, the plurality of network connected devices 18 may be configured to communicate with a user computing device 26 configured to connect to the WAN via the router 24.

The plurality of network connected devices 18 may take different forms and may perform different processes and functions. In the specific example illustrated in FIG. 2, the network connected devices 18 include a thermostat 28, a fireplace thermometer 30, a body thermometer 32, and a pet food measuring device 34. It should be appreciated that the specific example network connected devices 18 illustrated in FIG. 2 are merely exemplary, and that the network connected devices may take other suitable forms. As a few other non-limiting examples, the network connected devices 18 may take the form of a GPS unit, a vibration/movement sensor, printer, router, lights, HVAC unit, robot, smart speaker, smart watch, asset tracker, a speaker, a smart coffee machine, a refrigerator sensor, other types of sensors and measurement devices, other type of consumer or industrial IoT device, etc. that include processors, memory, stored programs, and communications interfaces that are able to connect to remote servers via computer networks. In the example illustrated in FIG. 2, each network connected device 18 is configured to measure a physical parameter, such as a temperature or a pet food level. However, it should be appreciated that the network connected devices 18 may take other forms that do not necessarily measure physical parameters, such as, for example, a network connected output device such a printer or display.

In one example, each network connected device 18 may include a processor or another type of hardware-logic component such as, for example, field-programmable gate arrays (FPGAs), program- and application-specific integrated circuits (PASIC/ASICs), program- and application-specific standard products (PSSP/ASSPs), system-on-a-chip (SOC), complex programmable logic devices (CPLDs), etc. The processor of each network connected device 18 may be configured to collect measured physical values via a sensor, perform a process or output, etc. The processor of each network connected device 18 may be further configured to send messages 36 from the network connected device 18 to the computing system 12 via the wireless network mediated by the router 24 and/or via the user computing device 26. In the illustrated example, the user computing device 26 takes the form of a large format display, and may include its own processor, non-volatile storage, volatile storage, and other suitable computer components. However, it will be appreciated that the client computer device 26 may take other suitable forms, such as, for example, a desktop computer device, a laptop computer device, smartphone, tablet computer device, etc.

Turning back to FIG. 1, in one example, when first connecting to a network, each network connected device 18 may be configured to communicate with a provisioning service 38 to perform an initialization process 40. The initialization process 40 may include checking whether any updates to the firmware/software of the network connected device 18 are available. The initialization process 40 may also include initializing the network connected device 18 with an address of a gateway 42 for the cloud platform 12. After receiving the address of the gateway 42 for the cloud platform 12, each network connected device 18 may be configured to communicate with the cloud platform 12 via a WAN. In this example, the internet protocol address of the provisioning service 38 may be provided to each network connected device 18 by the manufacturer or seller of that network connected device 18. In another example, the internet protocol address of the gateway 42 for the cloud platform 12 may be directly provided to the network connected device 18A by the manufacturer or seller of the network connected device 18.

As illustrated in FIG. 1, each network connected device 18 may be configured to send an indication of software interfaces 14 to the cloud platform 12 implemented by that network connected device 18. The indication may take the form, for example of a list 44. In one example, each network connected device 18 may be manufactured to implement one or more software interfaces 14, such as, for example, platform software interfaces 15 or custom software interfaces 16 indexed by the cloud platform 12. For example, the software/firmware of the network connected device 18 may be developed to conform to the explicit interaction contracts of the one or more software interfaces 14 the network connected device 18 is implementing. In one example, the list 44 of software interfaces may sent to the cloud platform 12 by the provisioning service 38, such as, for example, during the initialization process 40. In another example, an edge computing device 60, such as an edge gateway, may be configured to communicate with the network connected device 18, and forward the list 44 of software interfaces to the cloud platform 12.

In another example, the one or more software interfaces 14 for a network connected device 18 may be implemented by a network connected device associated software program 19 executed by a cloud computer device 17. The network connected device associated software program 19 may be configured to command and control one or more associated network connected devices 18. In the example illustrated in FIG. 1, the network connected device associated software program 19 is configured to communicate with the example network connected device 18B. The network connected device associated software program 19 is further configured to perform the functions and processes of the network connected devices 18 described herein. For example, the network connected device associated software program 19 may be configured to send the list of software interfaces 44 to the cloud platform 12 as well as send and received messages 36 with software services 20 executed on the cloud platform 12. The cloud computer device 17 executing the network connected device associated software program 19 may be a cloud server of the cloud platform 12, or may be a computer device separate from the cloud platform 12. In another example, an edge computing device 60 may implement the network connected device associated software program 19, and may similarly be configured to command and control one or more associated network connected devices 18, and send and received messages with the cloud platform 12.

As a specific example, the network connected device associated software program 19 may take the form of a software-controlled conference room. The network connected devices 18 associated with the network connected device associated software program 19 may include network connected lights that may be turned on/off by the network connected device associated software program 19, occupancy sensors that may send occupancy data to the network connected device associated software program 19, network connected air conditioning devices, etc. Further in this example, the network connected device associated software program 19 may be configured to implement one or more software interfaces 14, and may send/receive messages with software services 20 on the cloud platform. For example, a software service on the cloud platform may include code to command the network connected device associated software program 19 to turn the network connected light devices of the conference room on or off based on occupancy data received from an occupancy sensor network connected device.

In one example, each software interface 14 includes a semantic description of one or more capabilities and descriptive attributes of the network connected device 18 accessible by the plurality of software services 20. As a specific example, the semantic descriptions of the software interfaces 14 may be described using JavaScript Object Notation for Linked Data (JSON-LD). JSON-LD is designed to be usable directly as JSON as well as usable in Resource Description Framework (RDF) systems that provides a standard for describing resources in a distributed, extensible way. The semantic descriptions of the software interfaces 14 provide semantic type annotations of the one or more capabilities and descriptive attributes of the network connected devices 18, so that analytics, machine learning, user interfaces, and other computation can reason about the semantics of data received from that network connected device 18. It will be understood that semantic type annotations are human readable and machine readable, and can form the basis for downstream searching and data analytics of human readable and machine readable categories of data. For example, physical values measured by the thermostat 28, the fireplace thermometer 30, and/or the body thermometer 32 example networked connected devices 18 of FIG. 2 may be semantically annotated as "temperature". In this manner, the measured physical values sent to the cloud platform 12 by the these example network connected devices 18 can be reasoned about as temperature (charted together, compared, converted to like units, etc.).

Figure 3:
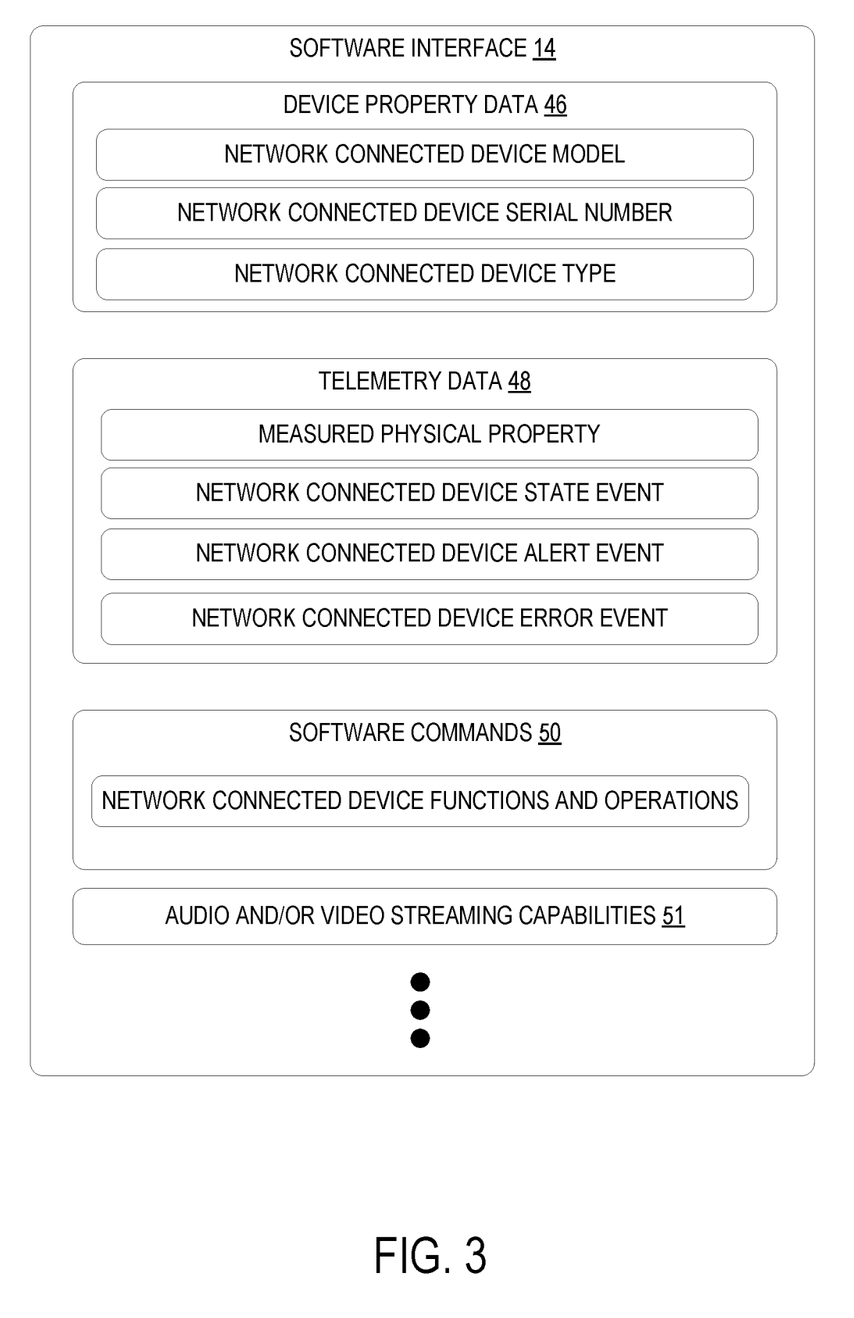
FIG. 3 shows a schematic view of the software interfaces of FIG. 1.

FIG. 3 illustrates an example software interface 14. The one or more capabilities and descriptive attributes of the network connected devices 18 may include device property data 46, telemetry data 48, software commands 50, and audio and/or video streaming capabilities 51 implemented by the network connected device, as a few non-limiting examples. However, it should be appreciated that other types of capabilities and descriptive attributes not described herein may also be included in the software interfaces 14. These capabilities describe related sets of functionalities utilized by the particular type of network connected device 18, such as, for example, the capabilities of a thermometer, a pet food measurement unit, an asset tracker, etc. In one example, the semantic description of the software interface 14 includes a network connected device property 46 selected from the group consisting of a network connected device model, a network connected device serial number, a network connected device manufacturer, a network connected device operating system, a network connected device memory property, and a network connected device type. The network connected device model may be a model number or identification set by a manufacturer of that network connected device 18. The network connected device serial number may be a serial number set by a manufacturer of that network connected device 18. The network connected device manufacturer may be a name of a manufacturer of that network connected device 18. The network connected device memory property may be a total memory size, a memory type, a manufacturer of the network connected device's memory, etc. The network connected device type may be a semantic description of the networked connected device, such as, for example, "thermometer", "asset tracker", etc. However, it should be appreciated that other types of read-only or read/write properties of a network connected device 18 may also be included in the software interface 14 for the network connected device property data 46.

In another example, the semantic description of the software interface 14 includes one or more defined events that can be generated by the network connected device 18 and emitted as telemetry data 48. The one or more defined events are selected from the group consisting of a physical property measured by the network connected device, a device state event, a device alert event, and a device error event. The semantic description for the physical property measured by the network connected device 18 may describe the physical property being measured and a data type for the property. For example, the semantic description for a thermometer network connected device 18 may indicate that the physical property being measured is a temperature, and that the value sent by the thermometer network connected device 18 is a double data type. The semantic description for the device state events may indicate how the network connected device 18 will be configured to emit device state information that may be captured by the software services 20. The semantic description for the network connected device alert and error events may indicate what type of alerts and events that the network connected device 18 is configured to emit, and a type for those alerts and errors. It should be appreciated that the defined events described above are merely exemplary, and that other types of events may be semantically described in the software interfaces 14.

In another example, the semantic description of the software interfaces 14 includes one or more software commands implemented by the network connected device 18. The semantic description may describe the functions and operations that the network connected device 18 can be instructed to execute by the software services 20. For example, the semantic description may describe a function name for the available commands, a developer comment describing what that command will do, a type of command execution such as synchronous or asynchronous, a data type for an input to the command, and a data type for an output of the command.

Figure 4:
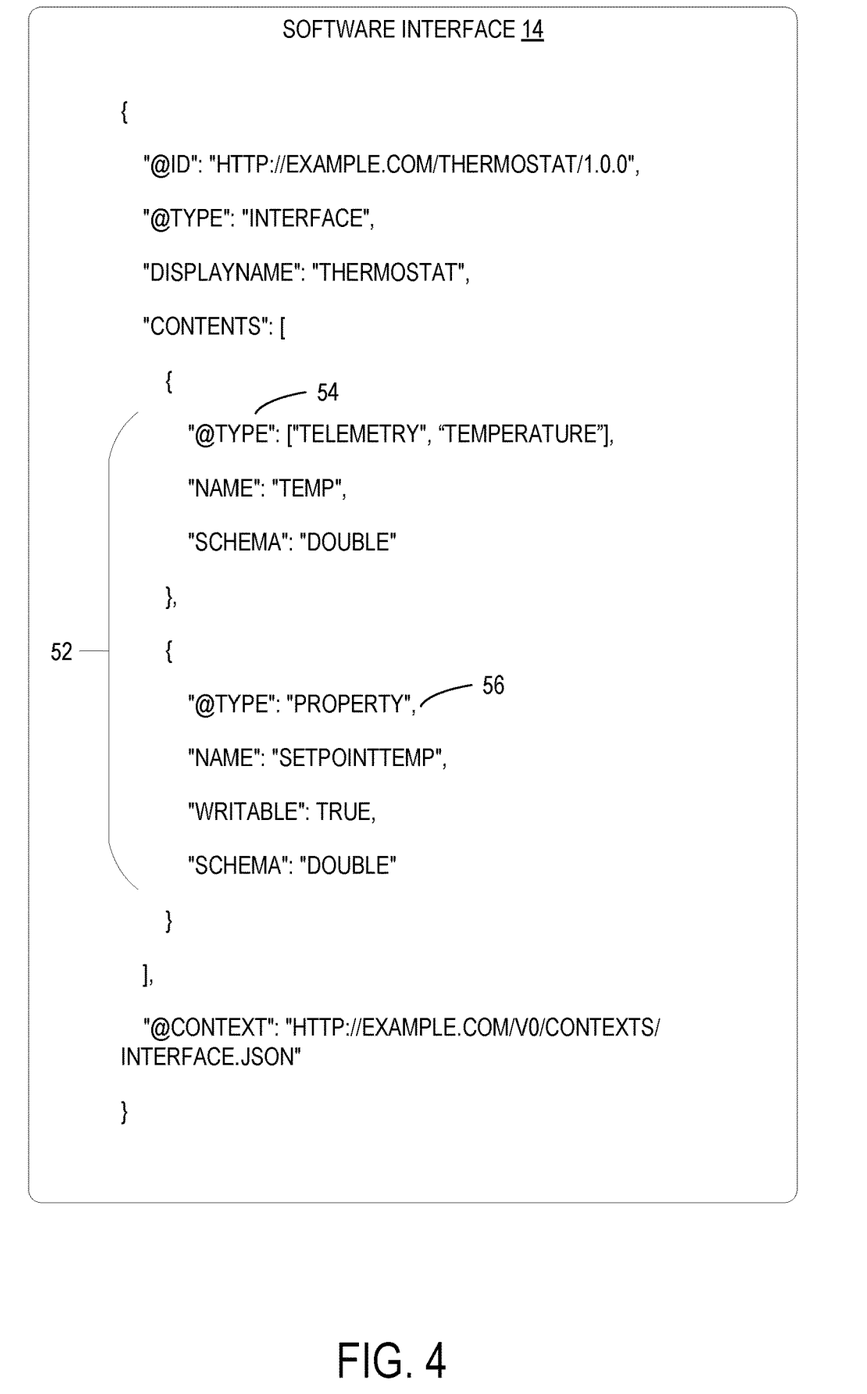
FIG. 4 shows an example of the software interfaces of FIG. 1.

FIG. 4 illustrates a specific example of a software interface 14. The example software interface 14 includes a semantic description 52 of one or more capabilities and descriptive attributes of the network connected devices 18. In the illustrated example, the semantic description 52 includes a defined telemetry event 54 for physical property data measured by the network connected device. As illustrated in FIG. 4, the defined telemetry event 54 further includes an additional semantic type "Temperature", which may be used to indicate that the telemetry data can be reasoned about as both telemetry and temperature. The semantic description 52 also indicates that the physical property measured by the associated network connected device 18 will be emitted as a double data type. Thus, any software service 20 configured for the illustrated software interface 14 can expect that the data emitted by the network connected device is a temperature value of the double data type, and may process that data accordingly. In this manner, the data emitted by the network connected device can be reasoned about as temperature (charted together, compared, converted to like units, etc.) by those software services 20. As another specific example, a body thermometer network connected device may implement a software interface 14 that includes a defined telemetry event 54 that further includes a BodyTemperature semantic type (e.g. {"@type": ["Telemetry", "Temperature", "BodyTemperature" ], "name": "temp", "schema": "double" }), which may be used to indicate that the telemetry data can be reasoned about as telemetry, temperature, and body temperature. It should be appreciated that while the examples illustrated in FIG. 4 and described above are based on the JSON-LD way of expressing semantic types, the software interfaces 14 are not limited to the JSON-LD. The software interfaces 14 may utilize any other suitable programming language, and may express semantic type via other suitable means.

In the illustrated example, the software interface further includes a semantic description for an example network connected device property 56. However, it should be appreciated that software interfaces 14 may include semantic descriptions for any suitable number of capabilities and attributes of network connected devices, such as, for example, one, three, seven, etc. As illustrated, the semantic description 52 for the example network connected device property 56 indicates that the network connected device includes a SETPOINTTEMP property that is writable with a double data type value. Similarly as described above with the defined telemetry event 54, the SETPOINTTEMP writable property may include a temperature semantic type (e.g. {"@type": ["Property", "Temperature" ],) Thus, software services 20 configured to operate on the software interface illustrated in FIG. 4 may reason that the SETPOINTTEMP is both a property and a temperature, and may send instructions to the thermostat network connected device to set its SETPOINTTEMP value to particular temperature value. As both the thermostat network connected device and the particular software service 20 are configured for the example software interface illustrated in FIG. 4, both the manufacturer of the thermostat network connected device and the developer of the particular software service 20 may have a common understanding of how the SETPOINTTEMP value of the thermostat network connected device may be manipulated. Further, in this manner, the software service 20 implementing the software interface will also be compatible with other network connected devices which may take other forms or created by other manufacturers, if those other network connected devices are implanting the software interface 14 illustrated in FIG. 4.

Turning back to FIG. 1, each network connected device 18 may be configured to implement one or more of the software interfaces 14. The cloud platform 12 is configured to receive, from a network connected device 18, an indication such as a list 44 of the one or more software interfaces 14 implemented by the network connected device 18. In one example, the one or more software interfaces 14 includes one or more platform software interfaces 15 managed by the cloud platform 12 and/or one or more custom software interfaces 16 created by manufacturers and developers. The platform software interfaces 15 may include, for example, software interfaces 14 for device information, application management, certification management, diagnostic logs, factory reset functions, reboot management, etc. However, it should be appreciated that developers and manufacturers may create and manage their own custom software interfaces 16 that may be implemented by the software services 20 and network connected devices 18.

After receiving the list 44 of software interfaces from the network connected device 18, the cloud platform 12 may be configured to select one or more software services 20 based on a match between the one or more software interfaces 14 implemented by the network connected device 18 and the one or more software interfaces 14 operated on by the plurality of software services 20. In the example illustrated in FIG. 1, the network connected device 18A is configured to implement the software interfaces A and software interface B of the plurality of software interfaces 14. After receiving the list 44 of software interface 44 from the network connected device 18A, which, in this specific example, includes software interface A and software interface B, the cloud platform 12 is configured to compare the receive list 44 of software interfaces to the software services 20 known to the cloud platform 12. In particular, the cloud platform 12 may be configured to filter the plurality of cloud services 20 based on the list 44 of software interfaces 44 received from the network connected device 18A. In the illustrated example, the software service 20A is configured to operate on the software interface A, and the software service 20B is configured to operate on the software interface B. Thus, the cloud platform 12 may be configured to select the software services 20A and 20B to process data and operate the network connected device 18A.

In one example, the software services 20 are executed by one or more server devices of the cloud platform 12, and the cloud platform 12 is configured to process data received from the network connected device 18 using the selected software services 20 according to the explicit interaction contracts of the one or more software interfaces 14. As a specific example, messages 36 received from and sent to the network connected device 18 may include a software interface tag 58 which indicates a particular software interface 14 that the data in the message 36 is associated with or otherwise conforms to. As a specific example, the thermostat network connected device may be configured to tag each message 36 that includes measured values for temperature data with a software interface tag 58 indicating the example software interface 14 of FIG. 4.

After receiving a message 36, the cloud platform 12 may be configured to route the message 36 to the selected software service 20 configured for the software interface 14 indicated in the software interface tag 58 of that message 36. In this manner, each message 36 may be routed to and processed by the appropriate software service 20. Messages 36 sent by software services 20, such as, for example, software commands 50, may also be tagged with the appropriate software interface tag 58 and sent to the network connected device 18 over the WAN.

In another example, the cloud platform 12 may be configured to identify an edge computing device 60 that may be configured to execute one or more software services 20 managed by the cloud platform 12, and is logically located on the same side of a WAN as the network connected device 18 relative to the cloud platform 12. As illustrated in FIG. 1, after identifying an edge computing device 60, the cloud platform 12 may be configured to send one or more of the selected software services 20 to the edge computing device 60, which may be configured to execute those software services 20. The cloud platform 12 may configure the network connected device 18 to route messages processed by the selected software service 20 to the edge computing device 60. Additionally, commands and messages from the cloud platform 12 to the network connected device 18 may also be routed through the edge computing device 60. In this example, the traffic from the cloud platform 12 may be processed by the edge computing device 60, which may send further commands and/or messages to the network connected device 18. The edge computing device 60 may be configured to process the messages 36 with the selected software service 20 as described herein, and perform and functions or processes of the selected software service 20. In this manner, the one or more selected software services 20 are executed by the edge computing device 60 that is separate from the cloud platform 12 configured to store the one or more software services 20. In the example illustrated in FIG. 1, software service 20B has been sent to the edge computing device 60. Thus, the example network connected device 18A may be instructed to route messages 36 associated with the software interface B to the edge computing device 60. On the other hand, messages 36 associated with the software interface A may be routed to the cloud platform 12, which is configured to execute the software service 20A configured to operate on the software interface A.

In one example, the cloud platform 12 is further configured to match the one or more software services 20 to the network connected devices 18 based on a ranking factor 62 for the software services 62. For example, if more than one software service 20 operates on the one or more software interfaces 14 implemented by the network connected device 18, the cloud platform 12 may be configured to select a preferred software service from the more than one software service 20 based on a ranking factor 62. The preferred software service 20 may subsequently be used to process data from the network connected device 18 as described above. In one example, the ranking factor 62 may include a popularity metric, a user score metric, an association factor, and a match score. The popularity metric may track how often that particular software service 20 is selected compared to other similar software services 20 that operate on similar software interfaces. The user score metric may track a user input of a score for each software service, such as a score of 1-10. The association factor may track whether the developer of a software service 20 is associated with the manufacturer of a network connected device, such that software services and network connected devices created by the same or associated parties may be selected together. The match score may indicate how closely the software interfaces 14 of the software service 20 matches the software interfaces of the network connected device.

In the example illustrated in FIG. 1, while both the software service 20A and the software service 20D operate on software interface A implemented by the network connected device 18A, the software service 20D also operates on software interface B which is also implemented by the network connected device 18A. Thus, based on the ranking factor 62 of a match score factor, the cloud platform 12 may be configured to select the software service 20D to match with the network connected device 18A.

In these examples, the cloud platform 12 has been described as selecting and matching software services 20 to the network connected devices 18 automatically. In another example, the cloud platform 12 may be further configured to present a list of selected software services 20 that match with the network connected device 18 to the user of the network connected device 18. As a specific example, the user may access a user account on the cloud platform 12 via a computing device, such as, for example, the user computing device 26 illustrated in FIG. 2. The user may control their selected software services 20 for operating their network connected devices through their user account on the cloud platform 12. In this example, the list of selected software services 20 may be presented to the user via an interface of the cloud platform 12 shown on a display of the user computing device 26. The list of selected software services 20 may be ranked based on the ranking factor for software services 62. The user may then select one or more software services 20 from the list. The user selected software services 20 may then be used to process data and operate the network connected device 18 as described herein.

In one example, the plurality of software interfaces 14 and the plurality of software services 20 are extensible. For example, users may select a software interface 14, and add additional semantic description and/or additional interaction contracts to the selected software interface 14. After extending the selected software interface, the extended software interface may be uploaded to the cloud platform 12.

Similarly, the software services 20 are extensible. Users may select one or more software services 20 stored on the cloud platform 12, and add additional code to the selected software service. The extended software service 20 may then be uploaded to the cloud platform 12 and used to process data from a network connected device 18 of that user. In this manner, users may utilize already existing software interfaces 14 and software services 20 available on the cloud platform 12 to generate their own software solutions by extending those existing software interfaces 14 and software services 20 to meet their specific needs.

As another example, the software interface of FIG. 4 may be applied to the thermostat 28, the fireplace thermometer 30, and the body thermometer 32 network connected devices illustrated in FIG. 2. However, while all three network connected devices measure the physical property of temperature, the ranges of expected temperatures for each network connected device may be different. For example, the thermostat network connected device 28 may expect temperature ranges between 60-80 degrees Fahrenheit, the fireplace thermometer network connected device 30 may expect temperature ranges between 400-800 degrees Fahrenheit, and the body thermometer network connected device 32 may expect temperature ranges at around 97-100 degrees Fahrenheit. Thus, the user may extend the example software interfaces of FIG. 4 to semantically describe the temperature measured by the specific network connected device. For example, the software interface for the thermostat network connected device 28 may be extended to semantically describe its measurements as "ROOM TEMP" while the software interface for the body thermometer network connected device may be extended to semantically describe its measurements as 'BODY TEMP". Further, the user may extend the example software interfaces of FIG. 4 to add additional data and capabilities to the software interfaces. For example, the user may add an operational range to a temperature value, such as, for example, 400-800 degrees Fahrenheit for the fireplace thermometer network connected device 30. The operational range may control the range of temperatures that the network connected device will be configured to detect. Once the example software interface of FIG. 4 has been extended with an operational range capability, software services 20 on the cloud platform 12 may then be configured to send commands to a network connected device to set and manage its operational range according to the extended software interface.

Figure 5:
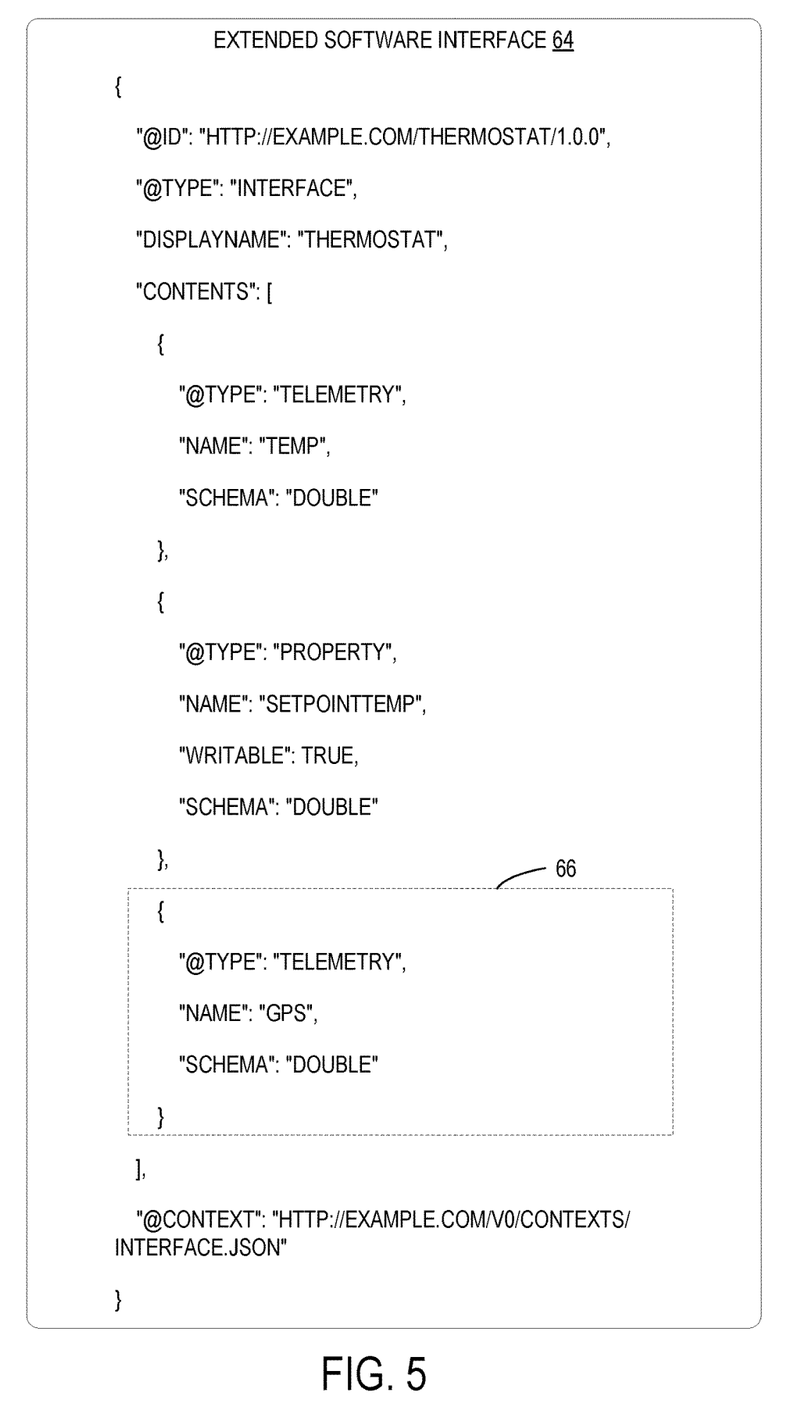
FIG. 5 shows an example of an extensible software interface of FIG. 1.

FIG. 5 illustrates an example extended software interface 64. In this example, the user has selected the example software interface 14 illustrated in FIG. 4, and has added a new telemetry capability 66 to the software interface 14. As illustrated, the extended software interface 64 includes a telemetry capability with a semantic description identifying that the physical value being measured is a "GPS" value that is provided in the double data type. The extended software interface 64 may then be uploaded by the user to the cloud platform 12. The user may further select a software service stored on the cloud platform 12, and add additional code to the selected software service to appropriately process the user's extended software interface 64. In another example, the extension to the software interface 14 may be authored and stored separately from the original software interface. In the specific example illustrated in FIG. 5, rather than adding the new telemetry capability 66 to the code of the original software interface 14, the new telemetry capability 66 could be authored and stored separately from the original interface, and uploaded to the cloud platform 12 with an indication that the new telemetry capability 66 is an extension to the original software interface stored on the cloud platform 12.

Figure 6:
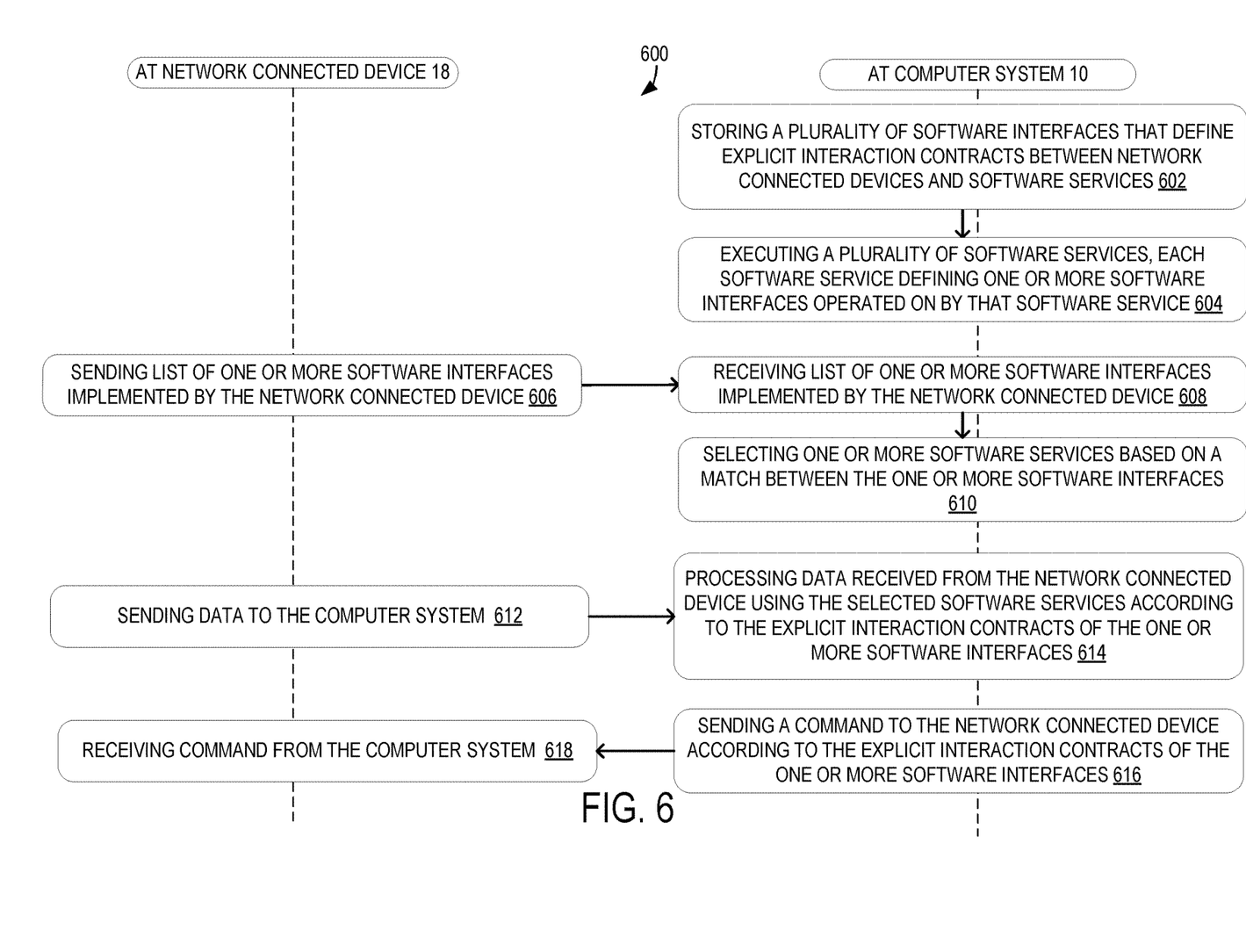
FIG. 6 shows a flowchart illustrating a method or processing data from network connected devices using software services according to the explicit interaction contracts of software interfaces implemented by the computer system of FIG. 1.

FIG. 6 is a flow chart of a method 600 implemented at a computer system including one or more processors. Method 600 may be executed using the systems described above or utilizing other suitable hardware and software elements.

At 602, the method 600 may include, at a computer system including one or more processors, storing a plurality of software interfaces that define explicit interaction contracts between network connected devices and software services. In one example, the plurality of software interfaces and the plurality of software services are extensible. As a specific example, the semantic descriptions of the software interfaces 14 may be described using JSON-LD. JSON-LD is designed to be usable directly as JSON as well as usable in Resource Description Framework (RDF) systems that provides a standard for describing resources in a distributed, extensible way. A specific example of extending a software interface is illustrated in FIG. 5.

In one example, each software interface includes a semantic description of one or more capabilities and descriptive attributes of the network connected device accessible by the plurality of software services. The semantic descriptions of the software interfaces 14 provide semantic type annotations of the one or more capabilities and descriptive attributes of the network connected devices 18, so that analytics, machine learning, user interfaces, and other computation can reason about the semantics of data received from that network connected device 18.

In this example, the semantic description may include a network connected device property selected from the group consisting of a network connected device model, a network connected device serial number, and a network connected device type. The network connected device model may be a model number or identification set by a manufacturer of that network connected device 18. The network connected device serial number may be a serial number set by a manufacturer of that network connected device 18. The network connected device type may be a semantic description of the networked connected device, such as, for example, "thermometer", "asset tracker", etc.

In another example, the semantic description may include one or more defined events that can be generated by the network connected device. In this example, the one or more events are selected from the group consisting of a physical property measured by the network connected device, a device state event, a device alert event, and a device error event. The semantic description for the physical property measured by the network connected device 18 may describe the physical property being measured and a data type for the property. For example, the semantic description for a thermometer network connected device 18 may indicate that the physical property being measured is a temperature, and that the value sent by the thermometer network connected device 18 is a double data type.

In another example, the semantic description includes one or more software commands implemented by the network connected device. The semantic description may describe the functions and operations that the network connected device 18 can be instructed to execute by the software services 20. For example, the semantic description may describe a function name for the available commands, a developer comment describing what that command will do, a type of command execution such as synchronous or asynchronous, a data type for an input to the command, and a data type for an output of the command.

At 604, the method 600 may include, at the computer system, executing a plurality of software services, each software service defining one or more software interfaces operated on by that software service. The software services may be developed by first or third parties, and uploaded to the computer system. Each software service specifies one or more software interfaces that the software service is configured to interact with.

At 606, the method 600 may include, at a network connected device, sending an indication, such as a list, of one or more software interfaces implemented by the network connected device. The list indicates each of the software interfaces that the network connected device was manufactured to comply with. These software interfaces may be selected from a plurality of platform software interfaces and/or custom software interfaces.

At 608, the method 600 may include, at the computer system, receiving the list of one or more software interfaces implemented by the network connected device.

At 610, the method 600 may include, at the computer system, selecting one or more software services based on a match between the one or more software interfaces implemented by the network connected device and the one or more software interfaces operated on by the plurality of software services. For example, if more than one software service 20 operates on the one or more software interfaces 14 implemented by the network connected device 18, step 610 may further include selecting a preferred software service from the more than one software service 20 based on a ranking factor 62. In one example, the ranking factor 62 may include a popularity metric, a user score metric, an association factor, and a match score.

At 612, the method 600 may include, at the network connected device 18, sending data to the computer system. The sent data may include various events, such as, for example, a measured physical property, a device state event, a device error or alert event, etc. The measured physical properties may, for example, include sensor data measured by sensors of the network connected device. Sent messages may further include a software interface tag 58 which indicates a particular software interface that the data in the message 36 is associated with or otherwise conforms to.

At 614, the method 600 may include, at the network connected device 18, processing data received from the network connected device using the selected software services according to the explicit interaction contracts of the one or more software interfaces. In one example, the selected one or more software services may be executed by an edge computing device of the computer system separate from a cloud platform of the computer system configured for storing the one or more software services, as illustrated in FIG. 1.

At 616, the method 600 may include, at the computer system 10, sending a command to the network connected device according to the explicit interaction contracts of the one or more software interfaces. The commands that the software service executed by the computer system may send to the network connected device are defined in the implemented one or more software interfaces. The one or more software interfaces may further define arguments for the commands, return values for the commands, etc. In examples where the one or more software services are executed on an edge computing device, the commands may be sent from the edge computing device to the associated network connected device. It should be appreciated that steps 614 and 616 may be enacted any suitable number of times and in any order.

At 618, the method 600 may include, at the network connected device 18, receiving the command from the computer system 10. The network connected device 18 may then process and enact the command, and return one or more values to the computer system 10 if applicable.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
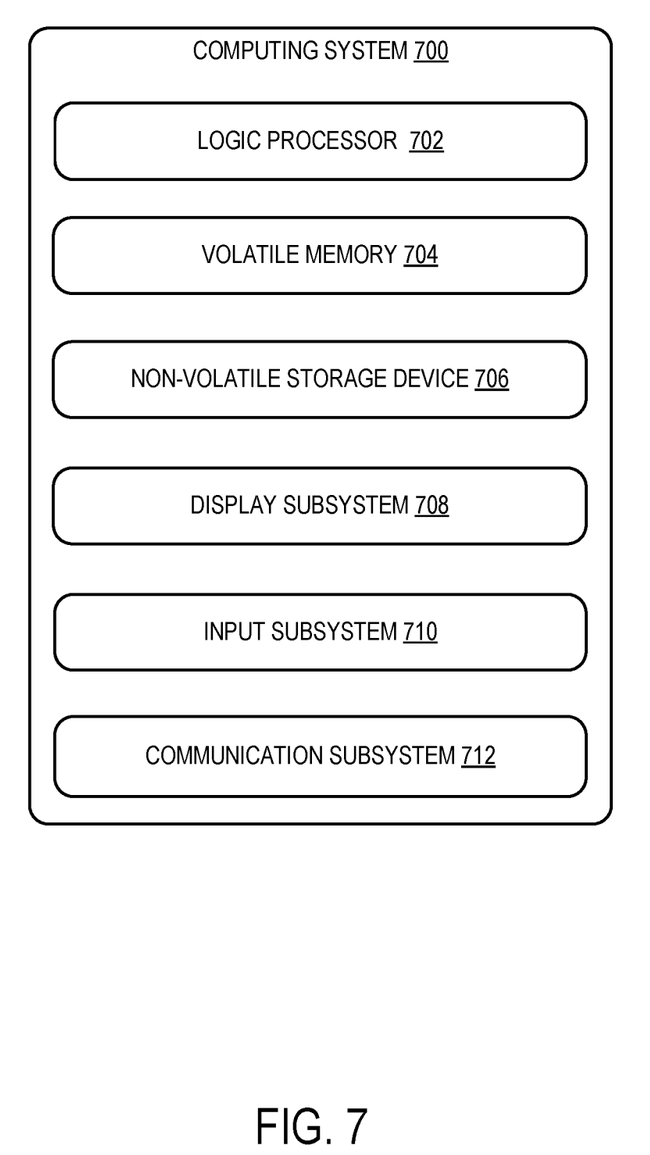
FIG. 7 shows a schematic view of an example computing environment in which the computer system of FIG. 1 may be enacted.

FIG. 7 schematically shows a non-limiting embodiment of a computing system 700 that can enact one or more of the methods and processes described above. Computing system 700 is shown in simplified form. Computing system 700 may embody the computer system 10, the network connected devices 18, the edge computing device 60, the client computing device 26, and other computing devices described above and illustrated in FIG. 1 and FIG. 2. Computing system 700 may take the form of one or more personal computers, server computers, tablet computers, home-entertainment computers, network computing devices, gaming devices, mobile computing devices, mobile communication devices (e.g., smart phone), and/or other computing devices such as industrial devices (e.g. industrial equipment, robots, etc.) and consumer devices (e.g. cars, coffee machines, appliances, etc.), and wearable computing devices such as smart wristwatches and head mounted augmented reality devices.

Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a computer system comprising one or more processors configured to store a plurality of software interfaces that define explicit interaction contracts between network connected devices and software services, execute a plurality of software services, each software service defining one or more software interfaces operated on by that software service, receive, from a network connected device, an indication of one or more software interfaces implemented by the network connected device, select one or more software services based on a match between the one or more software interfaces implemented by the network connected device and the one or more software interfaces operated on by the plurality of software services, and process data received from the network connected device or send a command to the network connected device using the selected software services according to the explicit interaction contracts of the one or more software interfaces. In this aspect, additionally or alternatively, each software interface may include a semantic description of one or more capabilities and descriptive attributes of the network connected device accessible by the plurality of software services. In this aspect, additionally or alternatively, the semantic description may include a network connected device property of the network connected device. In this aspect, additionally or alternatively, the network connected device property may be selected from the group consisting of a network connected device model, a network connected device serial number, a network connected device manufacturer, a network connected device operating system, a network connected device memory property, a network connected device type, and a read-write property. In this aspect, additionally or alternatively, the semantic description may include one or more defined events that can be generated by the network connected device. In this aspect, additionally or alternatively, the one or more events may be selected from the group consisting of a physical property measured by the network connected device, a device state event, a device alert event, and a device error event. In this aspect, additionally or alternatively, the semantic description may include one or more software commands implemented by the network connected device. In this aspect, additionally or alternatively, the plurality of software interfaces and the plurality of software services may be extensible. In this aspect, additionally or alternatively, if more than one software service operates on the one or more software interfaces implemented by the network connected device, the one or more processors may be configured to select a preferred software service from the more than one software service based on a ranking factor. In this aspect, additionally or alternatively, the ranking factor may be selected from the group consisting of a popularity metric, a user score metric, an association factor, and a match score. In this aspect, additionally or alternatively, to select one or more software services, the one or more processors may be configured to present a user with a list of software services based on the indication of one or more software interfaces implemented by the network connected device, and receive a user selection of one or more software services from the list of software services. In this aspect, additionally or alternatively, the selected one or more software services may be executed by an edge computing device separate from a cloud platform configured to store the one or more software services.

Another aspect provides a method comprising, at a computer system including one or more processors, storing a plurality of software interfaces that define explicit interaction contracts between network connected devices and software services, executing a plurality of software services, each software service defining one or more software interfaces operated on by that software service, receiving, from a network connected device, an indication of one or more software interfaces implemented by the network connected device, selecting one or more software services based on a match between the one or more software interfaces implemented by the network connected device and the one or more software interfaces operated on by the plurality of software services, and processing data received from the network connected device or sending a command to the network connected device using the selected software services according to the explicit interaction contracts of the one or more software interfaces. In this aspect, additionally or alternatively, each software interface may include a semantic description of one or more capabilities and descriptive attributes of the network connected device accessible by the plurality of software services. In this aspect, additionally or alternatively, the semantic description may include one or more defined events that can be generated by the network connected device. In this aspect, additionally or alternatively, the one or more events may be selected from the group consisting of a physical property measured by the network connected device, a device state event, a device alert event, and a device error event. In this aspect, additionally or alternatively, the semantic description may include one or more software commands implemented by the network connected device. In this aspect, additionally or alternatively, the plurality of software interfaces and the plurality of software services may be extensible. In this aspect, additionally or alternatively, the selected one or more software services may be executed by an edge computing device of the computer system separate from a cloud platform of the computer system configured for storing the one or more software services.

Another aspect provides a computer system comprising one or more processors configured to store a plurality of software interfaces that define explicit interaction contracts between software programs associated with network connected devices and software services, store a plurality of software services, each software service defining one or more software interfaces operated on by that software service, receive, from a software program associated with a network connected device, an indication of one or more software interfaces implemented by the software program, wherein the software program is configured to control the associated network connected device, select one or more software services based on a match between the one or more software interfaces implemented by the software program associated with the network connected device and the one or more software interfaces operated on by the plurality of software services, and process data received from the software program associated with the network connected device or send a command to the software program associated with the network connected device using the selected software services according to the explicit interaction contracts of the one or more software interfaces.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
one or more processors of one or more server devices of a cloud platform, configured to:
store a plurality of software interfaces at the cloud platform that are implemented by network connected devices and cloud-based software services, wherein each software interface defines an explicit interaction contract between network connected devices and cloud-based software services implementing that software interface, and wherein each software interface includes a semantic description of one or more capabilities and descriptive attributes of a network connected device implementing that software interface that are accessible by a cloud-based software service that implements that software interface;
execute a plurality of cloud-based software services on the cloud platform, each cloud-based software service being configured to implement a respective subset of the plurality of software interfaces and configured to interact with the one or more capabilities and descriptive attributes of a network connected device that implements the respective subset of the plurality of software interfaces;
receive, from a target network connected device, an indication of one or more software interfaces implemented at the target network connected device;
compare the one or more software interfaces implemented at the target network connected device to the respective subset of the plurality of software interfaces implemented by each of the plurality of cloud-based software services;
identify a match between the one or more software interfaces implemented at the target network connected device and a matched subset of the plurality of software interfaces implemented by one or more matched cloud-based software services, wherein the match indicates that the one or more matched cloud-based software services are configured to interact with the one or more capabilities and descriptive attributes of the target network connected device;
select one or more cloud-based software services from the one or more matched cloud-based software services; and
process data received from the target network connected device or send a command to the target network connected device using the selected cloud-based software services that are executed at the cloud platform according to the explicit interaction contracts of the one or more software interfaces implemented by the target network connected device.

2. The computer system of claim 1, wherein the semantic description includes a network connected device property of the network connected device.

3. The computer system of claim 2, wherein the network connected device property is selected from the group consisting of a network connected device model, a network connected device serial number, a network connected device manufacturer, a network connected device operating system, a network connected device memory property, a network connected device type, and a read-write property.

4. The computer system of claim 1, wherein the semantic description includes one or more defined events that can be generated by the network connected device.

5. The computer system of claim 4, wherein the one or more events are selected from the group consisting of a physical property measured by the network connected device, a device state event, a device alert event, and a device error event.

6. The computer system of claim 1, wherein the semantic description includes one or more software commands implemented by the network connected device.

7. The computer system of claim 1, wherein the plurality of software interfaces and the plurality of cloud-based software services are extensible.

8. The computer system of claim 1, wherein the one or more processors are configured to select the one or more cloud-based software services from the one or more matched cloud-based software services based on a ranking factor.

9. The computer system of claim 8, wherein the ranking factor is selected from the group consisting of a popularity metric, a user score metric, an association factor, and a match score.

10. The computer system of claim 1, where to select one or more cloud-based software services from the one or more matched cloud-based software services, the one or more processors are configured to present a user with a list of the one or more matched cloud-based software services, and receive a user selection of one or more cloud-based software services from the list of one or more matched cloud-based software services.

11. The computer system of claim 1, wherein the selected one or more cloud-based software services are executed by an edge computing device separate from the cloud platform configured to store the one or more cloud-based software services.

12. A method comprising:
at a cloud platform that includes one or more server devices including one or more processors:
storing a plurality of software interfaces at the cloud platform that are implemented by network connected devices and cloud-based software services, wherein each software interface defines explicit interaction contracts between network connected devices and cloud-based software services implementing that software interface, and wherein each software interface includes a semantic description of one or more capabilities and descriptive attributes of a network connected device implementing that software interface that are accessible by a cloud-based software service that implements that software interface;

executing a plurality of cloud-based software services on the cloud platform, each cloud-based software service being configured to implement a respective subset of the plurality of software interfaces and configured to interact with the one or more capabilities and descriptive attributes of a network connected device that implements the respective subset of the plurality of software interfaces;

receiving, from a target network connected device, an indication of one or more software interfaces implemented at the target network connected device;

comparing the one or more software interfaces implemented at the target network connected device to the respective subset of the plurality of software interfaces implemented by each of the plurality of cloud-based software services;

identifying a match between the one or more software interfaces implemented at the target network connected device and a matched subset of the plurality of software interfaces implemented by one or more matched cloud-based software services, wherein the match indicates that the one or more matched cloud-based software services are configured to interact with the one or more capabilities and descriptive attributes of the target network connected device;

selecting one or more cloud-based software services from the one or more matched cloud-based software services; and processing data received from the target network connected device or sending a command to the target network connected device using the selected cloud-based software services that are executed at the cloud platform according to the explicit interaction contracts of the one or more software interfaces implemented by the target network connected device.

13. The method of claim 12, wherein the semantic description includes one or more defined events that can be generated by the network connected device.

14. The method of claim 13, wherein the one or more events are selected from the group consisting of a physical property measured by the network connected device, a device state event, a device alert event, and a device error event.

15. The method of claim 12, wherein the semantic description includes one or more software commands implemented by the network connected device.

16. The method of claim 12, wherein the plurality of software interfaces and the plurality of cloud-based software services are extensible.

17. The method of claim 12, wherein the selected one or more cloud-based software services are executed by an edge computing device separate from the cloud platform configured for storing the one or more cloud-based software services.

18. A computer system comprising:
one or more processors of one or more server devices of a cloud platform, configured to:

store a plurality of software interfaces at the cloud platform that are implemented by software programs associated with network connected devices and cloud-based software services, wherein each software interface defines an explicit interaction contract between software programs associated with network connected devices and cloud-based software services implementing that software interface, and wherein each software interface includes a semantic description of one or more capabilities and descriptive attributes of a network connected device and an associated software program implementing that software interface that are accessible by a cloud-based software service that implements that software interface;

store a plurality of cloud-based software services on the cloud-platform, each cloud-based software service being configured to implement a respective subset of the plurality of software interfaces and configured to interact with the one or more capabilities and descriptive attributes of a network connected device and an associated software program that implements the respective subset of the plurality of software interfaces;

receive, from a target software program associated with a target network connected device, an indication of one or more software interfaces implemented at the target software program, wherein the target software program is configured to control the associated target network connected device;

compare the one or more software interfaces implemented the target software program that is configured to control the associated target network connected device to the respective subset of the plurality of software interfaces implemented by each of the plurality of cloud-based software services;

identify a match between the one or more software interfaces implemented the target software program that is configured to control the associated target network connected device and a matched subset of the plurality of software interfaces implemented by one or more matched cloud-based software services, wherein the match indicates that the one or more matched cloud-based software services are configured to interact with the one or more capabilities and descriptive attributes of the target software program associated with the target network connected device;

select one or more cloud-based software services from the one or more matched cloud-based software services; and process data received from the target software program associated with the target network connected device or send a command to the target software program associated with the target network connected device using the selected cloud-based software services according to the explicit interaction contracts of the one or more software interfaces implemented by the target software program.

* * * * *